United States Patent [19]
Ikenoue et al.

[11] Patent Number: 6,038,011
[45] Date of Patent: Mar. 14, 2000

[54] PHOTOGRAPHIC PRINTING METHOD

[75] Inventors: Shinpei Ikenoue; Takaaki Terashita, both of Kanagawa, Japan

[73] Assignee: Fuji Photo Film Co., Ltd., Kanagawa, Japan

[21] Appl. No.: 08/128,568

[22] Filed: Sep. 29, 1993

Related U.S. Application Data

[63] Continuation of application No. 07/753,770, Sep. 3, 1991, abandoned.

[30] Foreign Application Priority Data

Sep. 3, 1990 [JP] Japan .................................. 2-233573

[51] Int. Cl.$^7$ .................................................. G03B 27/52
[52] U.S. Cl. ................................ 355/40; 355/77; 396/311
[58] Field of Search ................................. 355/32, 35, 38, 355/40, 77; 354/106

[56] References Cited

U.S. PATENT DOCUMENTS

| | | |
|---|---|---|
| 3,782,947 | 1/1974 | Krall . |
| 4,279,945 | 7/1981 | Andran et al. . |
| 4,293,215 | 10/1981 | Rosborough et al. ..................... 355/40 |
| 4,302,523 | 11/1981 | Audran et al. . |
| 4,403,854 | 9/1983 | von Stein et al. ........................ 355/40 |
| 4,769,695 | 9/1988 | Terashita . |
| 4,797,713 | 1/1989 | Terashita et al. ........................ 355/38 |
| 5,130,745 | 7/1992 | Cloutier et al. ........................... 355/40 |
| 5,194,892 | 3/1993 | Robison ................................. 354/106 |

FOREIGN PATENT DOCUMENTS

| | | |
|---|---|---|
| 49-74019 | 7/1974 | Japan . |
| 50-30517 | 3/1975 | Japan . |
| 51-117632 | 10/1976 | Japan . |
| 52-30429 | 3/1977 | Japan . |
| 54-2115 | 1/1979 | Japan . |
| 55-101932 | 8/1980 | Japan . |
| 59-214023 | 12/1984 | Japan . |
| 62-189456 | 8/1987 | Japan . |
| 63-201645 | 8/1988 | Japan . |
| 63-188644 | 12/1988 | Japan . |
| 63-298233 | 12/1988 | Japan . |
| 64-21432 | 1/1989 | Japan . |
| 1280730 | 11/1989 | Japan . |
| 1280731 | 11/1989 | Japan . |
| 1280732 | 11/1989 | Japan . |
| 1280733 | 11/1989 | Japan . |
| 1293329 | 11/1989 | Japan . |
| 1296230 | 11/1989 | Japan . |
| 1297634 | 11/1989 | Japan . |
| 1302336 | 12/1989 | Japan . |
| 263029 | 3/1990 | Japan . |
| 646933 | 1/1991 | Japan . |
| WO9004205 | 4/1990 | WIPO . |

*Primary Examiner*—David M. Gray
*Attorney, Agent, or Firm*—Sughrue, Mion, Zinn, Macpeak & Seas, PLLC

[57] ABSTRACT

During the photographing of an image, photographic data corresponding to the image, such as a photographing date, subject brightness and distance, a shutter speed, an aperture size, data about illumination light, as well as photographic intention data, are recorded on a photographic film. An index code for identifying a recording format of the photographic data is recorded on the photographic film along with the photographic data. During printing, the index code is read out from the photographic film, and one of a plurality of predetermined data conversion tables which are memorized in a printer are selected so as to convert the photographic data into printer codes that can be used in the printer. Then, the photographic data read from the photographic film is converted according to the selected conversion table. Based on the converted photographic data and photometric values obtained from the image to be printed, a print-exposure amount is determined.

35 Claims, 20 Drawing Sheets

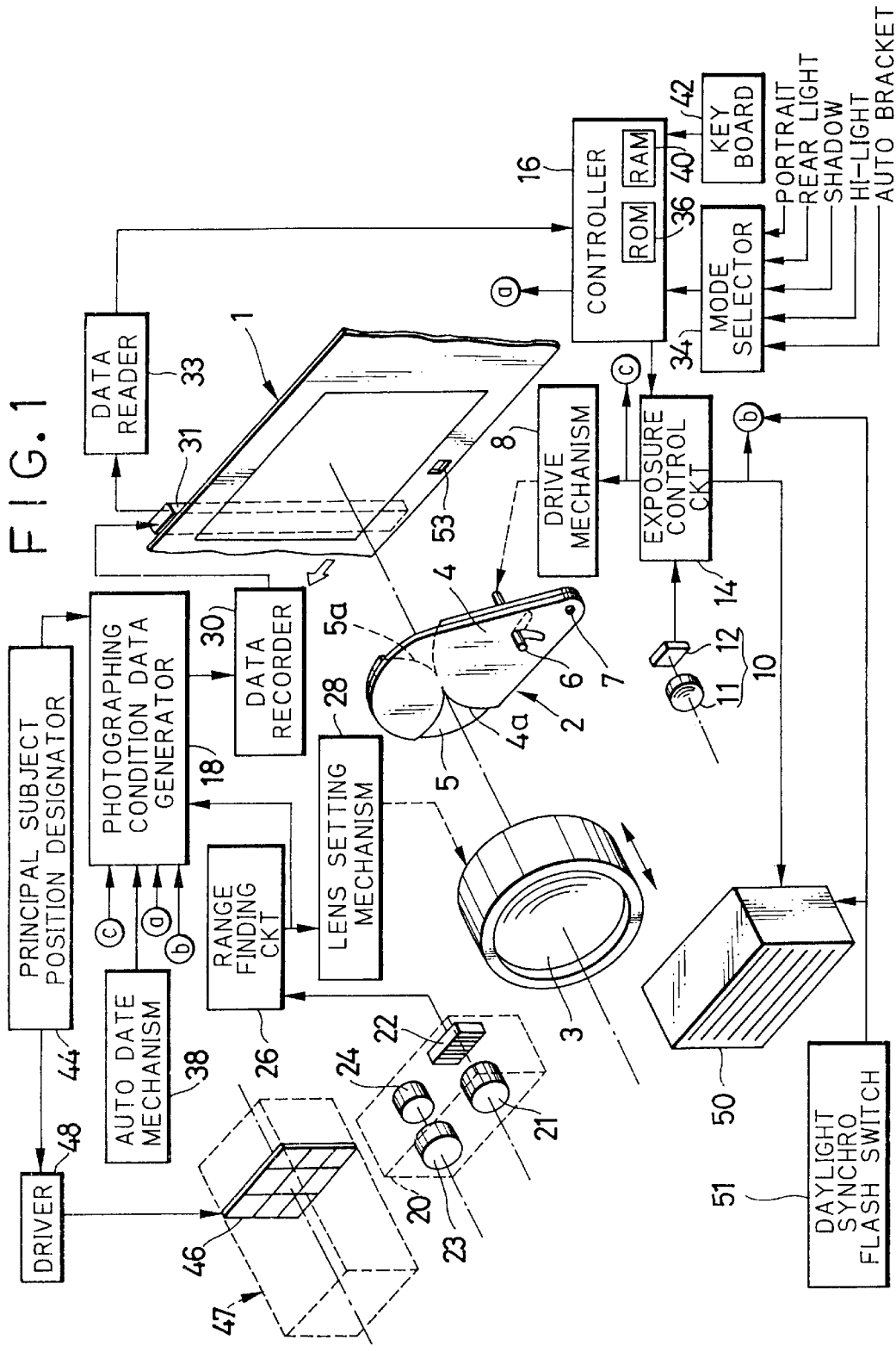

FIG. 3A

⟨RECORDING FORMAT IDENTIFYING DATA⟩

| DATA NAME | CONTENT | PRINTER CODE |
|---|---|---|
| INDEX CODE | 0 ~ 63 TYPES OF CODES CORRES. TO RECORDING FORMATS | |

FIG. 3B

⟨FILM DATA⟩

| DATA NAME | CONTENT | PRINTER CODE |
|---|---|---|
| FILM MAKER CODE | 0 ~ 63 TYPES | PRINT CHANNEL |
| FILM TYPE CODE | 0 ~ 63 TYPES | |
| FILM SPEED CODE | 0 ~ 63 TYPES | |
| FILM PRODUCTION YEAR CODE | 1990 ~ 2053 | YEAR |
| FILM PRODUCTION MONTH CODE | 1 ~ 12 | MONTH |
| REGION CODE | 0 ~ 63 TYPES | REGION |
| FILM LOT NUMBER CODE | 0 ~ 63 TYPES | |

FIG. 3C
⟨ PHOTOGRAPHING DATA ⟩

| DATA NAME | CONTENT | PRINTER CODE |
|---|---|---|
| PHOTOGRAPHING YEAR CODE | 1990 ~ 2053 | YEAR |
| PHOTOGRAPHING MONTH CODE | 1 ~ 12 | MONTH |
| PHOTOGRAPHING DAY CODE | 1 ~ 31 | DAY |
| PHOTOGRAPHING TIME CODE | 1 ~ 24 | HOUR |
| LV VALUE CODE | -32 ~ +31 | LV VALUE |
| SHUTTER SPEED CODE | 0 ~ 63 CODE TABLES | SHUTTER SPEED |
| APERTURE SIZE CODE | 0 ~ 63 CODE TABLES | APERTURE SIZE |
| REAR LIGHT CORRECTION AMOUNT CODE | -32 ~ +31 | LV VALUE |
| FLASH LIGHT CODE | 0 : ABSENT, 1 : PRESENT | ABSENT/PRESENT |
| FLASH LIGHT AMOUNT CODE | 0 ~ 63 CODE TABLES | GUIDE NUMBER |
| SUBJECT DISTANCE CODE | 0 ~ 63 CODE TABLES | DISTANCE |
| SUBJECT POSITION CODE | 0 ~ 63 CODE TABLES | POSITION |
| LENS FOCAL LENGTH CODE | 0 ~ 63 CODE TABLES | DISTANCE |
| COLOR TEMPERATURE SENSOR DATA CODE | 0 ~ 63 CODE TABLES | COLOR TEMPERATURE |

FIG. 3D

⟨PRINT ORDER DATA⟩

| DATA NAME | CONTENT | PRINTER CODE |
|---|---|---|
| TRIMMING MAGNIFICATION DATA CODE | 0 ~ 63 CODE TABLES | MAGNIFICATION |
| TRIMMING POSITION DATA CODE | 0 ~ 63 CODE TABLES | POSITION |
| PHOTOGRAPHING DATE RECORDING ORDER DATA | 0: ABSENT, 1: PRESENT | DATA RECORDING ON/OFF POSITION |
| COLOR CORRECTION COMMAND DATA | 0: ABSENT, 1: PRESENT | COLOR CORRECTION ABSENT/PRESENT |
| HIGH-LIGHT/SHADOW STANDARD COMMAND DATA | 0: NO COMMAND, 1: HIGH-LIGHT, 2: SHADOW STANDARD | HIGH-LIGHT STANDARD /SHADOW STANDARD |
| PORTRAIT DATA | 0: ABSENT, 1: PRESENT | ABSENT/PRESENT |
| AUTO BRACKET COMMEND DATA | 2 ~ 10 (PRINT NUMBER) | NUMBER OF PRINTS USING SHIFTED EXPOSURES |

FIG. 3E

⟨PRINTING DATA⟩

| DATA NAME | CONTENT | PRINTER CODE |
|---|---|---|
| PHOTO-LAB NAME CODE | 0 ~ 63 CODE TABLES | |
| DEVELOPMENT YEAR CODE | 1990 ~ 2053 | |
| DEVELOPMENT MONTH CODE | 1 ~ 12 | |
| DEVELOPMENT DAY CODE | 1 ~ 31 | |
| PRINT DENSITY CORRECTION CODE | 0 ~ 63 CODE TABLES | |
| PRINT COLOR CORRECTION CODE | 0 ~ 63 CODE TABLES | |
| DELIVERY DATA CODE | 0 ~ 63 CODE TABLES | |
| PRINT FORMAT CODE | 0 ~ 63 CODE TABLES | |
| DATA PRINTING FORMAT CODE | 0 ~ 63 CODE TABLES | |

F I G. 17
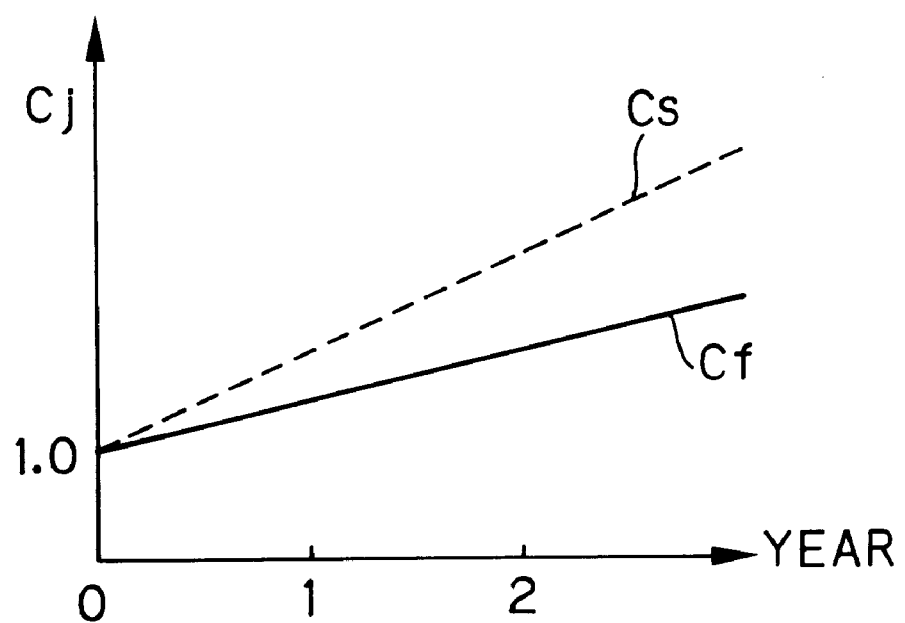

PHOTOGRAPHIC PRINTING METHOD

This is a Continuation of Application Ser. No. 07/753,770 filed Sep. 3, 1991, now abandoned.

BACKGROUND OF THE INVENTION

1. Field of the Invention

The present invention relates to a photographic printing method and, more particularly, to a photographic printing method which uses photographing data recorded in a recording medium by a camera, thereby facilitating the making of high quality photographic prints.

2. Description of the Related Art

Recently, thanks to the automatization of exposure control and/or focusing in cameras, anyone can take pictures at an appropriate photographic condition including aperture size and shutter speed. This is especially true when one uses an expensive high grade camera such as disclosed, for example, in Japanese Laid-open Patent Publication No. 2-63029, which uses IC cards each memorizing an optimum photographic condition for a specific kind of scene, so that one can automatically take pictures in a manner as if taken with complex and difficult manual techniques. On the other hand, thanks to improvements in photographic films and papers, as well as progress in developing and printing techniques, the standard of quality of finished prints has been remarkably improved.

As a result, the quality of a print of a picture taken by an inexpensive camera almost compares with that taken by an expensive, high grade camera. However, in conventional automatic printing, print-exposure is uniformly controlled based on the condition of each picture recorded on the photographic film, according to a standardized control program, irrespective of the situation of each picture and the photographer's intention. Therefore, the finely controlled photographic conditions of a picture taken by a high grade camera and the photographer's intent will not be sufficiently reflected in the print.

Furthermore, automatic printing cannot yet make full use of the improved properties of the photosensitive materials.

In order to make prints which meet the photographer's intention as closely as possible, it has been suggested to record various photographic data concerning an individual picture, such as the photographing date and time of the picture, the shutter speed and aperture size used to take the picture, on a photographic film by a camera on taking the picture (Japanese Laid-open Patent Publications Nos. 51-117632, 59-214023, 64-6933, 63-201645, 49-74019, 55-101932, and 54-2115, and Japanese Laid-open Utility Model Publication No. 63-188644).

Cameras which record data indicative of the kind of illumination light of each picture on photographic films are known (e.g., Japanese Laid-open Patent Publications Nos. 51-117632 and 52-30429). Also, cameras which record data about trimming are known (e.g., Japanese Laid-open Patent Publications Nos. 63-298233 and 64-21432). Cameras recording characters indicating the kind of scene and other information optically on a photographic film are also known (e.g., Japanese Laid-open Patent Publications Nos. 50-30517, 55-101932 and 54-2115).

However, because the above-mentioned known cameras record photographic data in many different ways, the photographic data can only be utilized in specific printers which are individually designed. Although it has been suggested to record such various photographic data as above in the form of codes on magnetic recording tracks provided on the film surface in PCT/US 89/04366, the prior art does not teach how to utilize the photographic data recorded as codes. Therefore, it is still impossible to utilize the photographic data totally and universally in printing.

Furthermore, because the above-described high grade cameras using an IC card lack a medium for transmitting the specific photographic conditions used to a photofinishing laboratory, a print made from a picture taken by such a high grade IC card camera will not always reflect the high grade photographic technique.

Also known are cameras which detect respective conditions of pictures recorded on a photographic film to determine, for example, color temperature, whether flash light was used or not, whether the flash light was over or under, whether exposure was over or under, and so forth, and record the determined data on a recording medium so as to utilize the data in printing (Japanese Laid-open Patent Publications Nos. 1-280730, 1-280731, 1-280732, 1-280733, 1-293329, 1-296230, 1-297634, 1-302336 and 2-56534). However, because cameras are not large enough in size to incorporate an operating device which performs a complex algorithm, it is possible that the camera may make an erroneous judgment, for example, in determining the kind of light source based on the detected data. Therefore, the judgment by the camera lacks reliability. Furthermore, the need for providing the operating device increases the cost of the camera.

SUMMARY OF THE INVENTION

In view of the foregoing, the present invention has an object to provide a photographic printing method which produces high quality prints by making sufficient and efficient use of the properties of the photosensitive materials and the functions of the camera, namely, by utilizing the various photographic data recorded.

To achieve the above and other objects and advantages, the present invention includes the steps of memorizing conversion tables for converting photographic data into coded data that can be used in a printer, a conversion table being prepared for each of the recording formats of the photographic data recorded on a recording medium such as photographic film; recording index data along with the photographic data, the index data being indicative of the recording format of the photographic data; reading the index data and the photographic data of an image frame when printing the image frame; selecting one of the conversion tables corresponding to the index data; converting the photographic data read according to the one of the conversion tables selected; obtaining photometric values from the image frame; and determining the print-exposure amount based on the converted photographic data and the photometric values.

The photographic data includes light source data for discriminating a flash light, fluorescent light, tungsten light, daylight, and other kinds of light from one another. The photographic data may also includes daylight synchronized flash data, portrait data, rear light data, and artistic intention data. The print-exposure amount is decided according to one of a plurality of exposure calculation equations which are previously memorized.

According to the present invention, various photographic data such as light source data, daylight synchronized flash data, portrait data, rear light data, and so forth which have been recorded by a camera on a recording medium are converted into coded data that can be used in a printer, so that a print-exposure is determined based on the photographic data and three color densities detected from the image frame to be printed.

In this way, print-exposure determination takes various data into consideration, and it is possible to automatically perform print-exposure correction in color balance and in density depending on the kind of light source and the kind of scene, as well as the photographer's intention.

BRIEF DESCRIPTION OF THE DRAWINGS

The invention will be more clearly understood from the following description in conjunction with the accompanying drawings, wherein:

FIG. 1 shows an example of a camera which records various photographic data on a photographic film;

FIG. 3A shows a table for converting recording format identifying data into a printer code;

FIG. 3B shows a table for converting film data into a printer code;

FIG. 3C shows a table for converting photographing data into a printer code;

FIG. 3D shows a table for converting print order data into a printer code;

FIG. 3E shows a table containing printing data;

FIG. 17 is a color correction table for compensating for the aging of the photographic film.

DETAILED DESCRIPTION OF THE PREFERRED EMBODIMENT

Figure 2A:
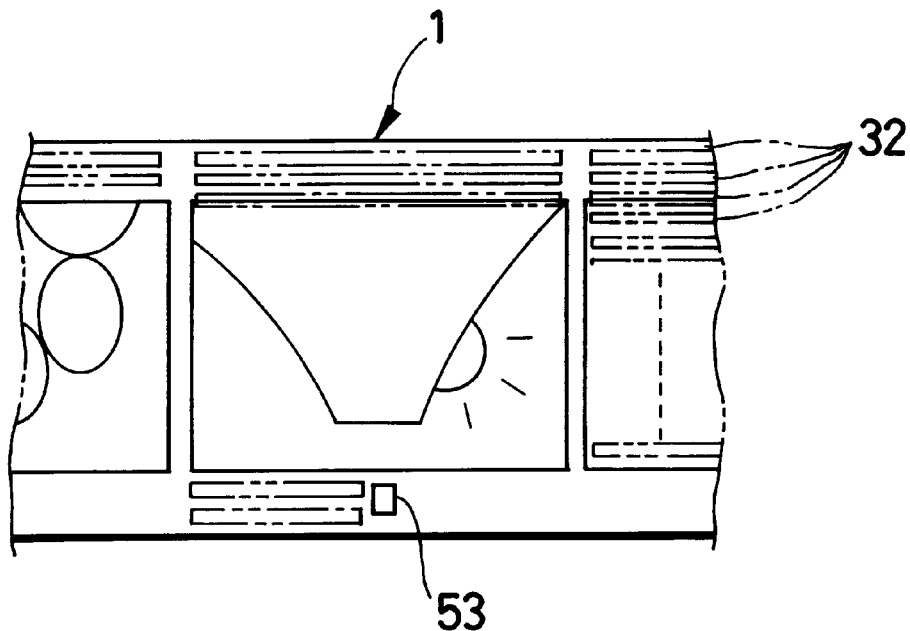
FIG. 2A is a plan view showing a part of the photographic film having photographic data recorded thereon.

FIG. 1 shows a camera which records data about a photograph beside each image frame on a photographic film 1. In the camera, a shutter mechanism 2, which is disposed behind a taking lens 3, includes a pair of shutter blades 4 and 5 each having a cut-out 4a, 5a. When a movable pin 6 is moved toward a stationary pin 7 by a drive mechanism 8, the shutter blades 4 and 5 are pivoted in opposite directions about the stationary pin 7 such that the cut-outs 4a and 5a overlap each other and an aperture is provided momentarily. Light passed through this aperture becomes incident on the film 1 to make the photograph.

A brightness measurement section 10 includes a lens 11 and a photosensor 12, and measures the subject brightness (BV) upon depression of a release button (not shown). A brightness signal from the photosensor is sent to an exposure control circuit 14, which then calculates a light value (LV) based on the subject brightness value indicated by the brightness signal and a film speed. Depending on the light value, the exposure control circuit 14 controls the shutter mechanism 2 through the drive mechanism 8 in accordance with a program in a controller 16. It is to be noted that, in this embodiment, the light value is used as subject brightness data and is sent to a photographing condition data generator 18, because with the same film speed the light value is proportional to the subject brightness.

A distance measuring unit 20 includes a light receiving section consisting of a lens 21 and a line sensor 22, and a light projecting section consisting of a lens 23 and a light source 24. When the release button is half depressed, the light projecting section projects a near-infrared spot light beam toward a principal subject, so that light reflected by the principal subject is received by the line sensor 22. A signal output from the line sensor 22, which is indicative of an incident position of the reflected light within the line sensor 22, is sent to a range finding circuit 26 so as to detect the distance to the principal subject. The range finding circuit 26 outputs data on the subject distance to a lens setting mechanism 28, which sets the taking lens 3 in a position according to the subject distance upon full depression of the release button.

Figure 2B:
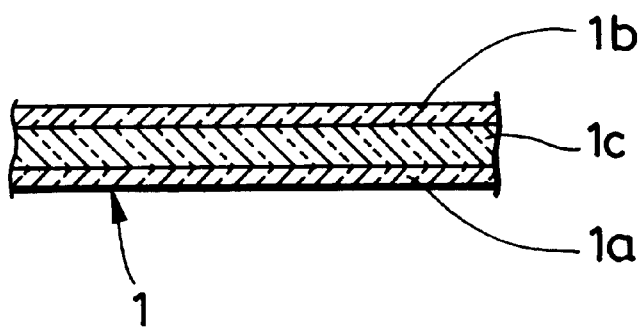
FIG. 2B is an enlarged cross sectional view of the photographic film of FIG. 2A.

The photographing condition data generator 18 codes respective photographing condition data, and sends the codes to a data recorder 30. The data recorder 30 drives a magnetic read/write head 31 to write the coded photographing condition data on a magnetic recording layer 1a in a plurality of tracks 32, as shown in FIGS. 2A and 2B. The magnetic recording layer 1a is disposed on the opposite surface of the film 1 to the photosensitive emulsion layer 1b.

The magnetic read/write head 31 also reads data recorded in the tracks 32, and sends them to a data reader 33 wherein the regenerated data is decoded into film data such as the film speed. The data on the film speed is sent to the controller 16.

The controller 16 is connected to a mode selector 34 for selecting a photography mode of the camera. The operator can select at least one of various predetermined photography modes including a portrait mode, a rear light mode, an auto bracket mode and so forth. It is to be noted that the auto bracket mode is a printing mode wherein a series of prints are generated using gradually changed exposure densities. The controller 16 then reads out predetermined program data which corresponds to the selected photography mode or modes from a ROM 36, each program data being indicative of a shutter speed and an aperture size. The controller 16 sends the shutter speed and aperture size to the exposure control circuit 14 and, at the same time, sends the photographing condition data generator 18 a mode signal corresponding to the selected photography mode or modes.

The photographing condition data generator 18 also receives a flash command signal from the exposure control circuit 14, a date signal indicative of the date and time of photographing from an auto date mechanism 38, and a photographing location signal from a RAM 40 of the controller 16. The photographing location is manually written in the RAM 40 through a keyboard 42.

The photographing condition data generator 18 further receives a principal subject position signal from a principal subject position designator 44. In order to designate the position of the principal subject in the photographic scene, a liquid crystal display panel 46 having a plurality of segments is disposed in a viewfinder 47. The display panel 46 is ordinarily transparent. Each segment of the display panel corresponds to an area of the photographic scene, to which an area code is assigned. Thus, the operator can designate the segment where the principal subject is present by entering the corresponding area code through the keyboard 42 while looking at the principal subject through the viewfinder 47. Based on the entered area code, the principal subject position designator 44 outputs a position signal indicative of the designated segment to the photographing condition data generator 18 and, at the same time, drives the designated segment through a driver 48. The designated display segment is driven by the driver 48 such that it alternately becomes opaque and transparent. In this way, it is possible to visually confirm whether the position of the principal subject has been correctly designated.

Data on the principal subject position may also be automatically detected by a position detecting device, instead of the above-described manual designation. In this case, framing of a scene is performed after focusing on a principal subject. The amount of relative movement of the principal subject within a photographic field during the framing is determined based on data detected by an image area sensor, and the position of the principal subject is determined based on the determined amount of movement and data on subject distance. This automatic position detecting technique is disclosed in U.S. patent application Ser. No. 07/554,330.

The exposure control circuit 14 includes a well-known subject brightness determining device for determining whether the subject brightness is low or high, so that the exposure control circuit 14 automatically outputs a flash command signal to a flash unit 50 in synchronism with control of the shutter mechanism 2 when the subject has a low brightness. The flash unit 50 is also connected to a daylight synchro flash switch 51. When the daylight synchro flash switch 51 is turned on, the flash unit 50 flashes even when the subject brightness is in the high level. The flash command signal and a daylight synchro flash signal sent from the switch 51 to the flash unit 50 are also sent to the photographing data generator 18.

FIGS. 2A and 2B show the photographic film 1 having the photographing data recorded thereon. The film 1 has perforations 53 punched along one edge thereof and disposed at constant intervals, so as to enable measurement of the length of advancement of the film 17 during one frame of film by detecting the perforations. As shown in FIG. 2B, the magnetic recording layer 1a is provided on the surface of a film base 1c opposite to the photosensitive emulsion layer 1b, and entirely covers this surface. The magnetic recording layer 1a is preferably made of transparent magnetic recording materials, such as disclosed in U.S. Pat. Nos. 4,302,523 and 3,782,947.

Besides the above-described photographing data, it is possible to record other data on the magnetic recording layer 1a, such as data recording format identifying data, film data, print order data and printing data. Ordinarily, 6 bits are allocated to each data, so that each data can have up to 64 variations. However, sometimes only one-bit is allocated to each data. For example, flash command data and daylight synchro data are only allocated one-bit, wherein "1" and "0" indicate presence and absence of the flash command signal or the daylight synchro signal, respectively.

The data recording format identifying data indicates one of a plurality of previously classified data recording formats, for example, one of 64 types of data recording formats. The various recording formats are necessary because the data recording format differs depending on the camera maker as well as camera grade. Of all the data recorded on the magnetic layer 1a, the data recording format identifying data is read out first so as to determine the data recording format of the data. According to the determined format, the remaining data, such as photographing data and film data, are read out.

FIGS. 3A, 3B, 3C and 3D show tables of recorded data, namely, the recording format identifying data, the film data, the photographing data, the print order data, and the printing data, respectively. The film data is recorded during manufacturing, whereas the photographing data and the print order data are recorded on photographing. The printing data is recorded on printing.

Figure 4:
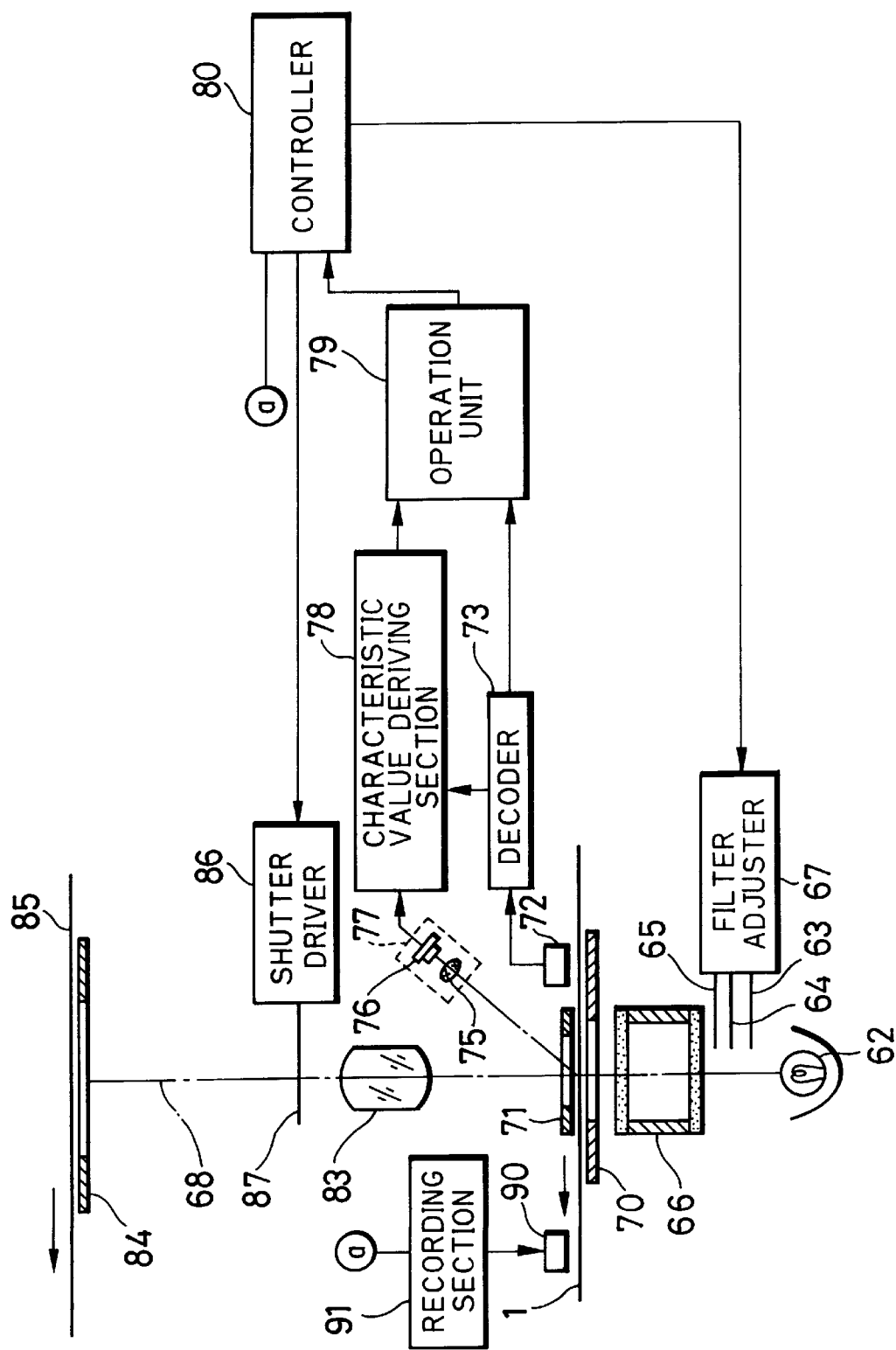
FIG. 4 shows an example of a printer which reads data recorded on the photographic film and records printing data on the photographic film.

FIG. 4 illustrates a photographic printer, wherein a white light radiated from a light source 62 passes through a cyan filter 63, a magenta filter 64 and a yellow filter 65, and enters a mixing box 66. The degree of insertion of each of these color correction filters 63 to 65 into a light path 68 is controlled by a filter adjuster 67, so as to adjust the balance of three primary color components of a printing light and the intensity thereof. The mixing box 66 is constructed of a rectangular tube having an inner mirror surface, and diffusion plates mounted on both opposites ends of the rectangular tube. Light passing through the mixing box 66 illuminates the picture frame of the developed film 1 placed in a printing position.

The developed film 1 is supported by a film carrier 70 disposed at the printing position. So as to ensure the evenness of the film 1 in the film carrier 70, a film mask 71 is disposed at the printing position. The film mask 71 is formed with an opening corresponding to the size of the picture frame as well known in the art. The film mask 71 is pressed onto the film 1 during printing, and is removed from the film 1 while the film 1 is being transported, by means of a solenoid (not shown).

A magnetic read head 72 is disposed at the entrance of the printing position relative to the film transporting direction. Before each picture frame is placed in the printing position, the magnetic read head 72 reads out the recorded data related to the picture frame, such as recording format identifying data, film data, photographing data, and print order data. The data read out by the read head 72 is decoded by a decoder 73, according to the associated recording format identifying data, into data of a format that is adaptable to the photographic printer. The decoded data is sent to an operation unit 79.

A scanner 77, constructed of a lens 75 and an image area sensor 76, is disposed diagonally above the printing position, so as to measure the light transmitted through each pixel of the picture frame placed at the printing position. The signals from the scanner 77 are sent to a characteristic value deriving section 78, which calculates characteristic values of the picture frame to be printed, such as three color separation densities of each pixel, a large area transmittance density, an average transmittance density at a particular area of a frame, and the like respectively for each color. The characteristic values are sent to the operation unit 79, which calculates a print exposure amount for each color depending on the decoded data as well as the characteristic values. According to the calculated print exposure amount, a controller 80, which includes a well-known microcomputer, controls various parts such as a shutter driver 86 as well as the filter adjuster 67.

A printing lens 83 is disposed above the printing position to enlarge and project an image in a specified frame onto a color paper 85 positioned at the back of a paper mask 84. Between the printing lens 83 and the color paper 85, there is disposed a shutter 87 whose open/close operation is controlled by the shutter driver 86.

After printing, a magnetic write head 90 and a recording section 91 are used to record the printing data on the film 1.

Figure 5:
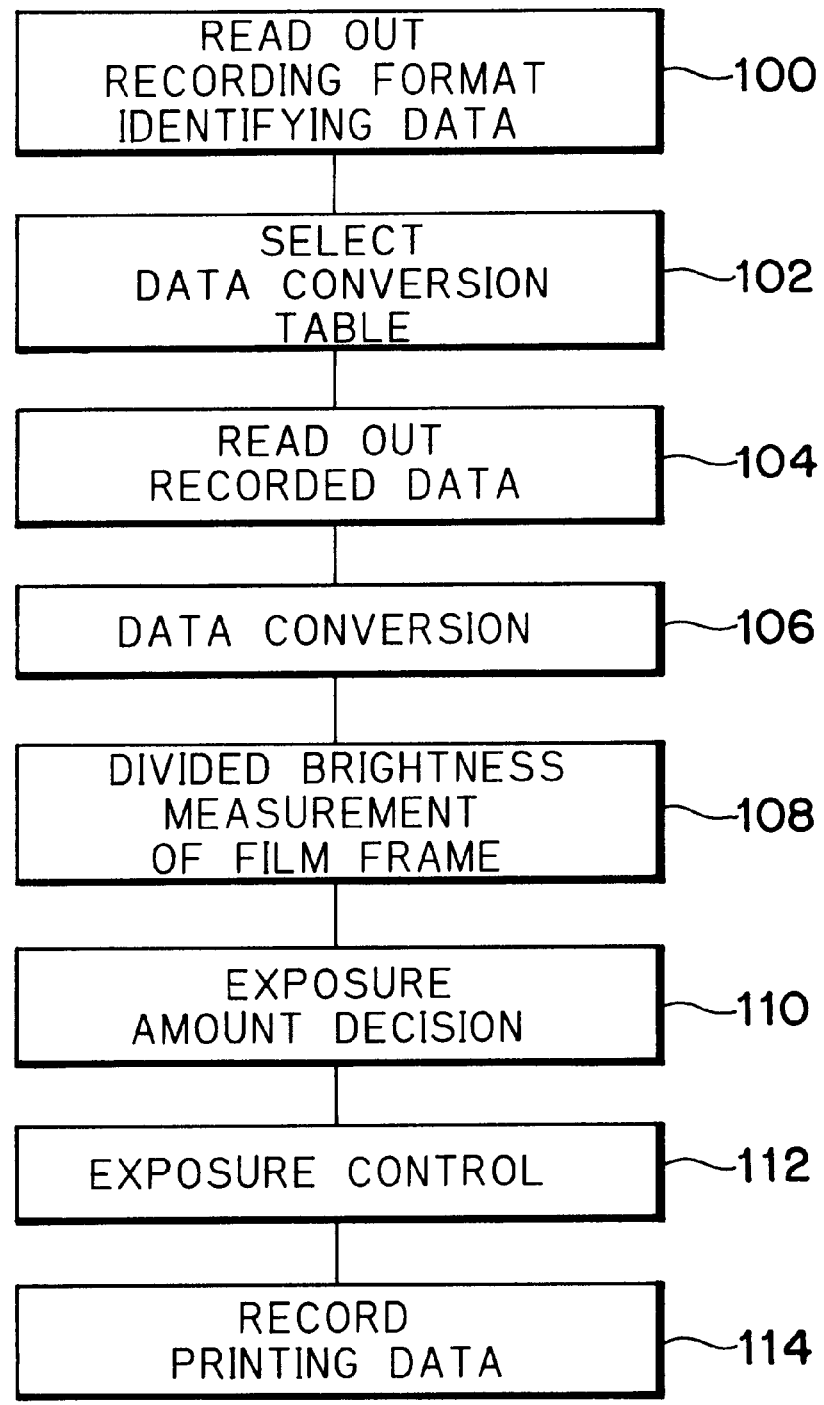
FIG. 5 is a flowchart explaining a sequence of photographic printing according to the present invention.

FIG. 5 illustrates the printing procedure according to an embodiment of the present invention. First, data recorded on the film 1 are read out through the magnetic read head 72 and the decoder 73. Initially, the recording format identifying data of the recorded data is read out (100). A data conversion table is then selected corresponding to the determined recording format (102). Next, the remainder of the recorded data is read out (104). In accordance with the selected data conversion table, the data read are converted into data applicable to the printer (106). Next, characteristic values of an image of a frame to be printed are calculated, e.g., light transmitted through the image is subjected to three color separation density calculations for each pixel (108). Then, among the photographing data, light source data and the daylight synchro data are referred to for discriminating the light source used for photographing of the image. Depending on the light source, a fundamental print exposure amount is calculated by using a corresponding one of a plurality of print exposure calculating equations which are predetermined for each light source (110).

The fundamental print exposure amount is corrected using exposure correction values calculated based on data about photographic subject and photographic scene. According to the corrected print exposure amount, the set positions of the color filters 63–65 are adjusted (112). After printing, the printing data, such as photo-lab data, developing date, print density correction data, color correction data, delivery data, printing format code, and data printing format identifying data, are recorded on the magnetic recording layer 1a of the film 1 through the magnetic write head 90 and the recording section 91 (114).

Figure 6:
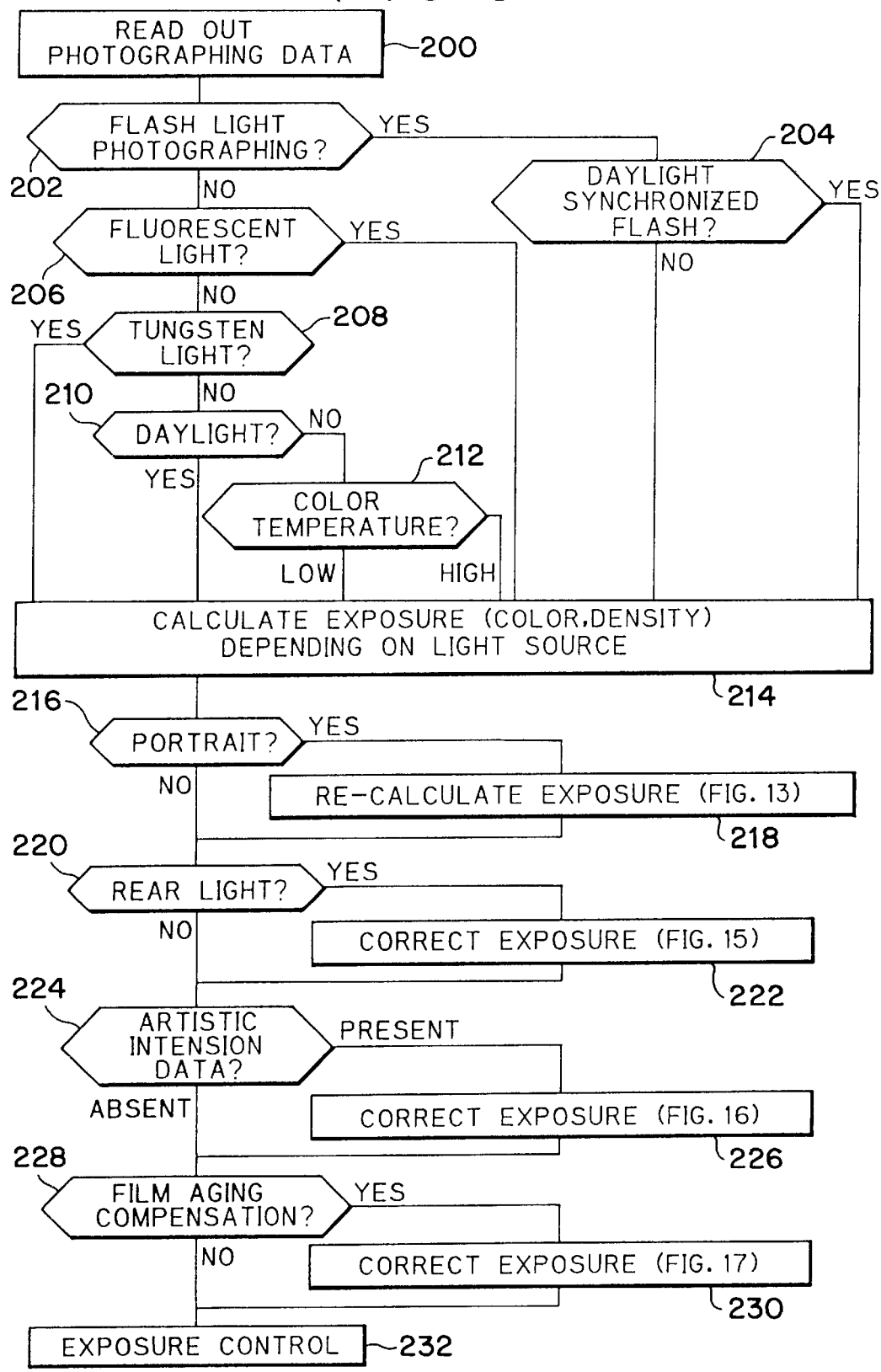
FIG. 6 is a flowchart explaining a program sequence for controlling print-exposure.

Referring now to FIG. 6, the print exposure control sequence will be described in more detail.

The print exposure control sequence begins with the recorded data which has been read out (104) and converted (106). In particular, the sequence begins by reading out the photographing data (200). It is determined based on the flash light code of the photographing data whether the picture was taken using flash light photography or not (202). In the case of flash light photography, it is determined whether the picture was taken using daylight synchronized flash photography or standard flash photography (204). In the case of a picture frame taken without a flash, it is determined whether the kind of light source used is fluorescent light (206), tungsten light (208), daylight (210), or some other type of light. In cases where the light source used is other than fluorescent light, tungsten light, and daylight, it is determined whether the color temperature of that light source is high or low (212). This classification of the light source used can be performed using various methods. Next, a fundamental exposure amount is calculated depending on the light source (214). Thereafter, the fundamental exposure amount is re-calculated or corrected prior to exposure control depending on the presence of photographing data other than the light source data (216–232). Steps 216–232 are described in more detail below with reference to FIGS. 13, 15, 16 and 17.

Figure 7:
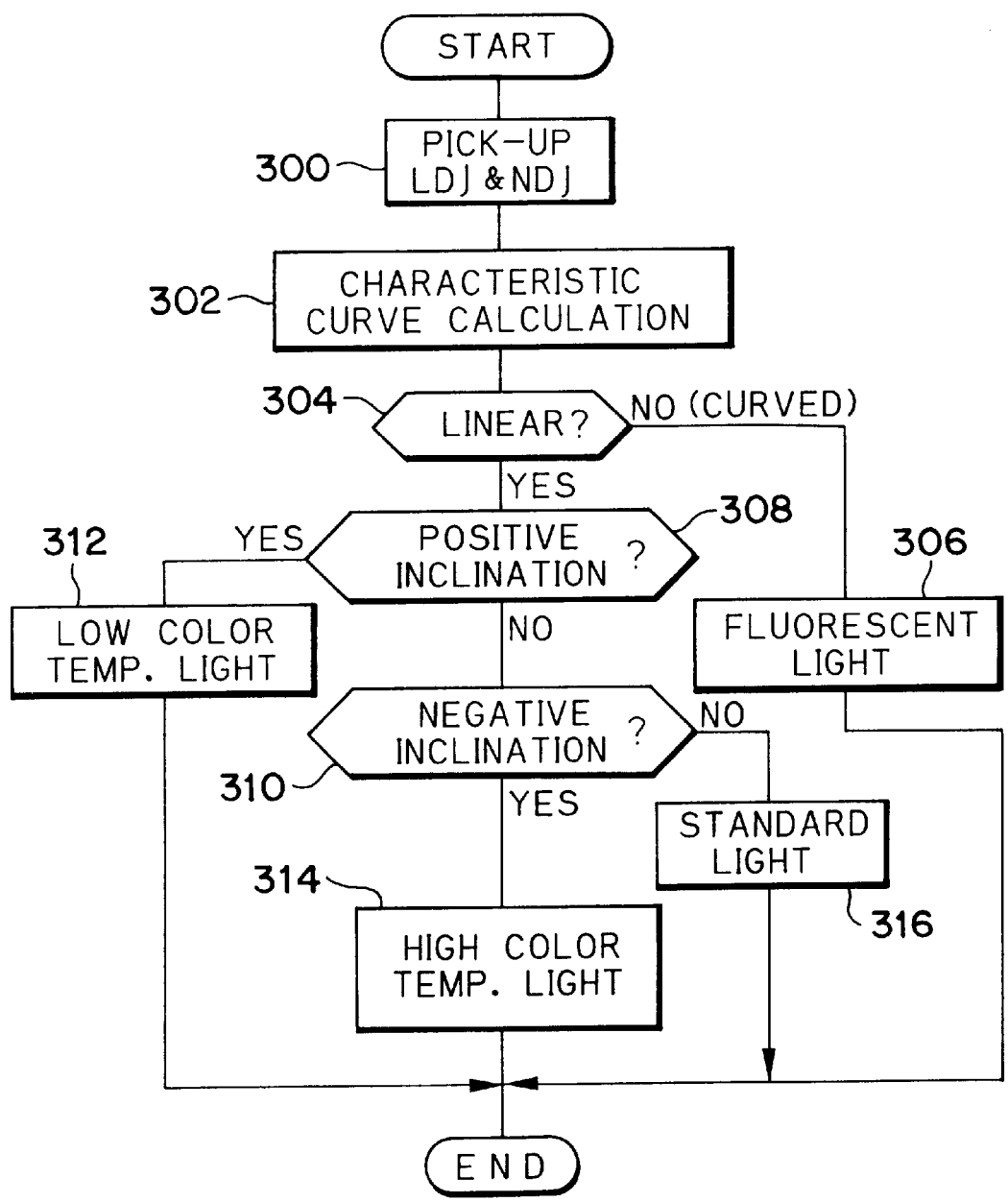
FIG. 7 is a flowchart of a first embodiment of a color temperature presuming routine.
Figure 8:
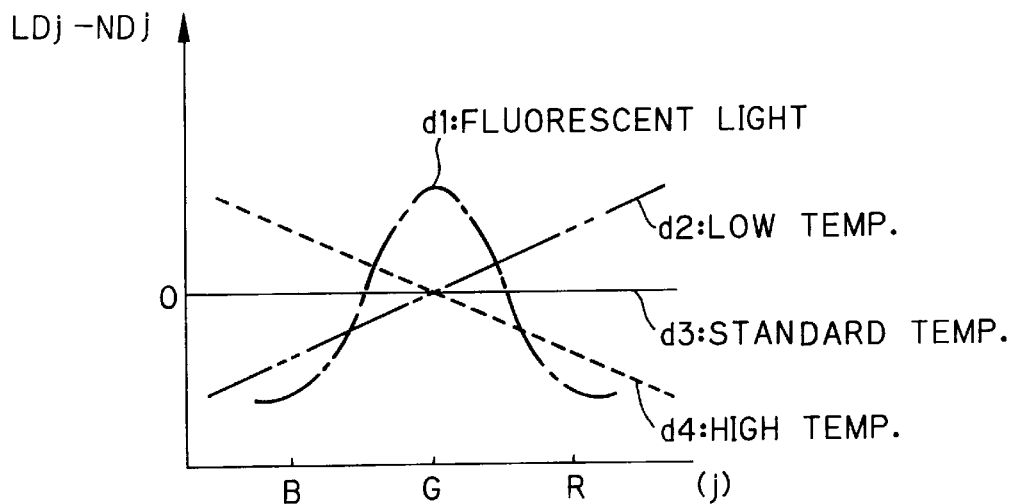
FIG. 8 is a diagram explaining the theory of the first embodiment of the color temperature presuming routine.

According to a first embodiment of the classification method as illustrated in FIGS. 7 and 8, the camera measures three color densities of the whole area or a part of the photographic subject by means of a three color photometric device, to thereby record the resulting color data (light source color densities) as photographing data onto the film.

As illustrated in FIG. 8, the difference between the light source color density "LDj" and the averaged density, e.g., LATD, of a standard picture frame "NDj" for each color "j(R,G,B)" has a different characteristic value depending on the light source. When the color temperature of the light source is a standard level, the characteristic curve of the difference "LDj–NDj" relating to the color "j" is a linear line d3 extending parallel to the "j" axis. When the color temperature of the light source is low, the characteristic curve of the difference "LDj–NDj" relating to the color "j" is a linear line d2 having positive inclination, whereas the characteristic curve is a linear line d4 having negative inclination when the color temperature is high. If the light source is a fluorescent light source, the characteristic curve becomes as shown by a line d1.

Therefore, in the color temperature presumption routine of FIG. 7, initially the light source color densities LDj and the averaged densities of the standard image NDj are obtained from the photographing data (300). Next, the densities obtained are used to calculate and determine what kind of characteristic curve d2, d2, d3 and d4 indicate (302). Next, it is determined whether the characteristic curve is linear (304). If the curve is as shown by the line d1, which is not linear, then the light source is regarded as a fluorescent light source (306). If the curve is linear, then it is determined whether the inclination is positive or negative (308; 310). In the case of a positive inclination, the light source is regarded as a low color temperature light source (e.g., color temperature of lower than 4500° K.) (312). In the case of a negative inclination, the light source is regarded as a high color temperature light source (e.g. color temperature of higher than 6000° K.) (314). If the characteristic curve has no inclination, the light source is regarded as a standard light source (e.g. color temperature within a range from 4500 to 6000° K.) (316). It is to be noted that tungsten light is included in low color temperature light.

Figure 9:
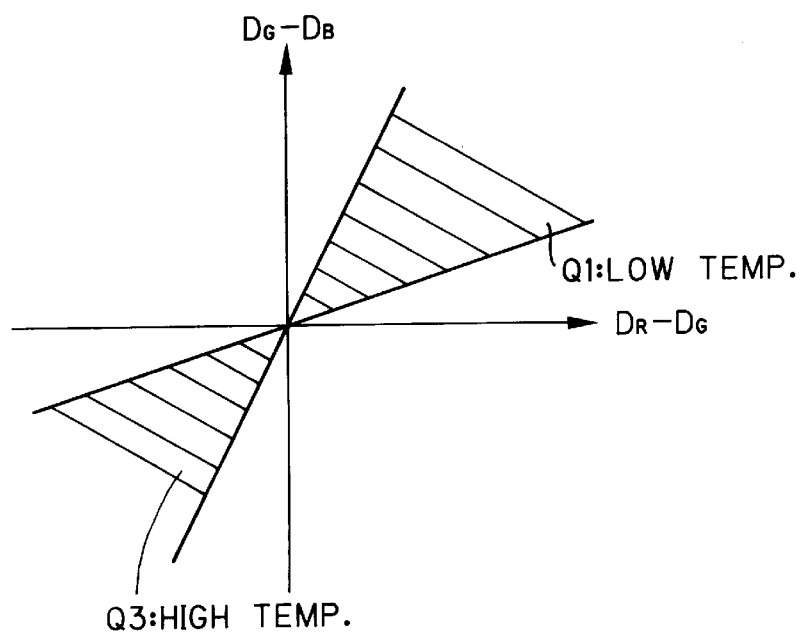
FIG. 9 is a graph explaining a second embodiment of the color temperature presuming routine.

FIG. 9 shows a coordinate system used in a second embodiment of the color temperature presumption routine, wherein the abscissa indicates the color difference between the averaged red color density "$D_R$" of an image and the averaged green color density "$D_G$" thereof, and the ordinate indicates the difference between the averaged green color density "$D_G$" thereof and the averaged blue color density "$D_B$" thereof. In the coordinate system, a shaded or hatched area O1 in the first quadrant indicates the range within which the color differences of low color temperature light are present, and a shaded area O3 in the third quadrant indicates the range within which the color differences of high color temperature light are present. Therefore, it is possible to determine the color temperature of the light source illuminating a photographic subject, depending on which area O1 or O3 the color differences "$D_G$–$D_B$" and "$D_R$–$D_G$" of averaged color densities of the photographed image belong to.

A third embodiment of the color temperature presumption routine uses the photographing date and time to determine the color temperature of the light source. Individual sunrise times SO and sunset times SI of the respective dates are previously memorized for each region, e.g., east, west, north and south regions, and also a period of time Tx necessary for the sun to rise up to a predetermined angle from the sunrise time SO is set according to the season and/or region. The time period Tx is, for example, 1 hour in the summer and 3 hours in the winter, or 1 hour in the south region and 3 hours in the north region.

Figure 10:
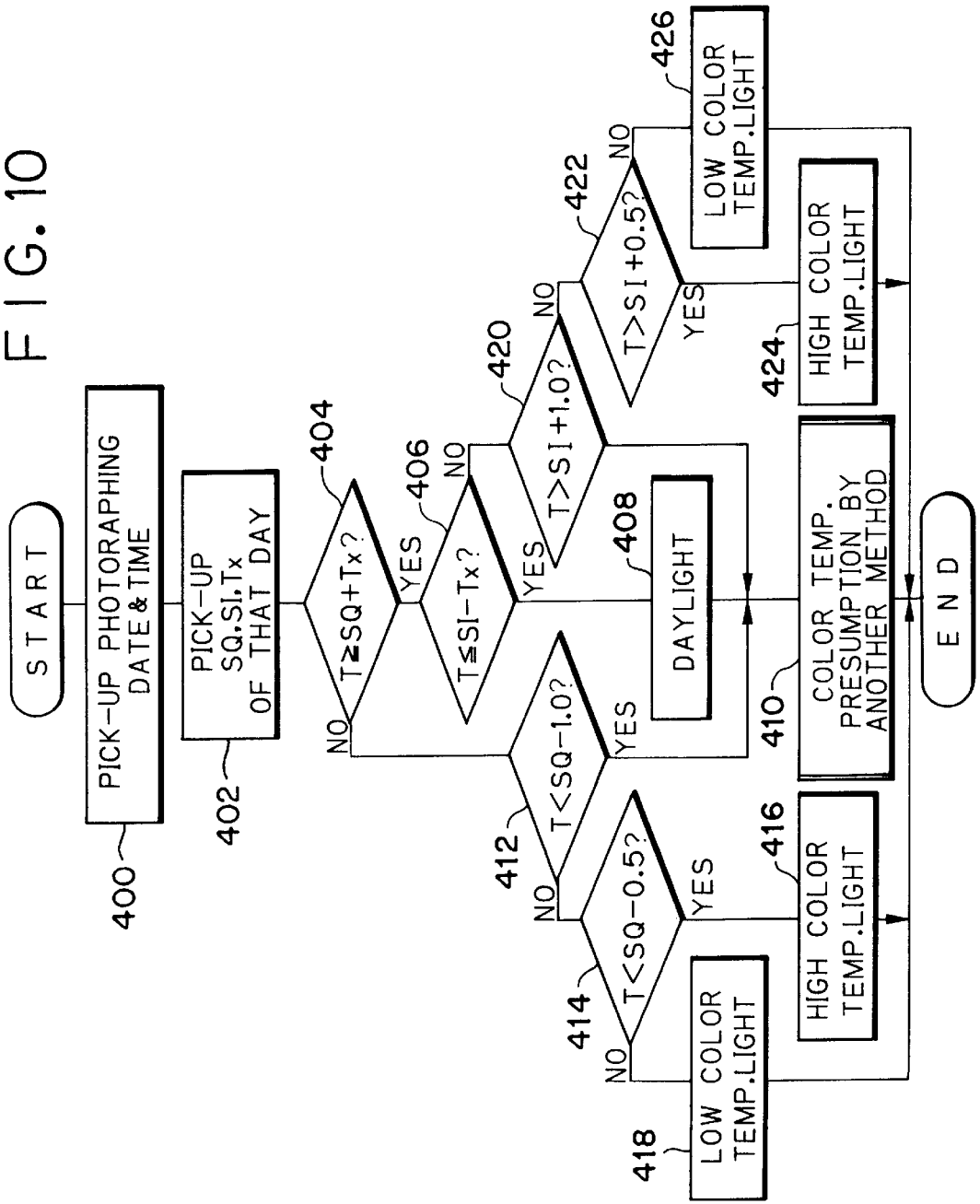
FIG. 10 is a flowchart of a third embodiment of the color temperature presuming routine.

FIG. 10 illustrates a color temperature presumption routine of the third embodiment. First, the photographing data are read out to obtain the photographing data and time T (400), so that corresponding sunrise and sunset times SO and SI and time period Tx can be detected (402). Thereafter, the photographing time T is compared with the time "SQ+Tx" as well as with the time "SI−Tx" (404; 406). If SQ+Tx≦T≦SI−Tx, then the illumination light is determined to be daylight (408). The color temperature of that light is then presumed by one of the above-described color temperature presumption methods (410).

If T<SQ+Tx, then the photographing time T is compared with the time one hour before sunrise "SQ−1.0" (412), and with the time a half hour before sunrise "SQ−0.5" (414), respectively. If T<SQ−1.0, it is determined that the photograph was taken at night. In this case, the color temperature is also presumed by one of the above-described color temperature presumption methods (410).

If SQ−1.0≦T<SQ−0.5, it is determined that the illuminating light has a high color temperature because the photograph was taken within one hour to a half hour before sunrise (416). If SQ−0.5≦T<SQ+Tx, it is determined that the illuminating light has a low color temperature because the photograph was taken in the time period from a half hour before sunrise to the time at which the sun rises up to the predetermined angle (418).

If T>SI−Tx, then the photographing time T is compared with the time one hour after sunset "SI+1.0" (420), and with the time a half hour after sunset "SI+0.5" (422), respectively. If the photographing time T is later than one hour after sunset, it is determined that the photograph was taken at night, so that the color temperature is presumed by one of the above-described color temperature presumption methods (410). If the photographing time T is within a half hour to one hour after sunset, it is determined that the color temperature of the illuminating light is high (424). If SI−TX<T≦SI+0.5, it is determined that the color temperature is low (426).

Figure 11:
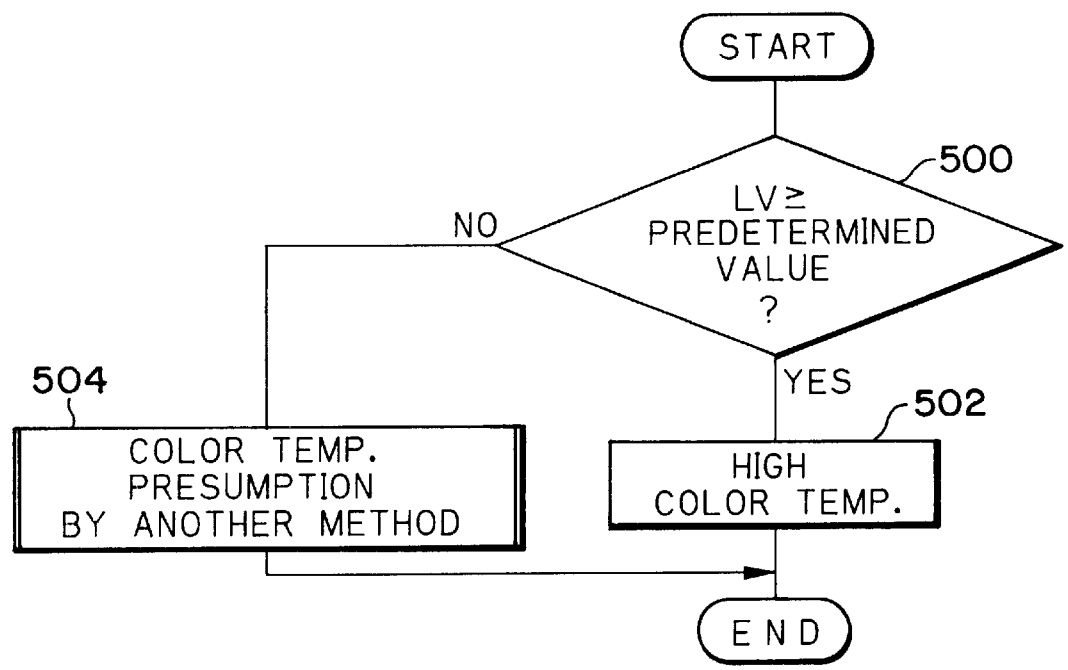
FIG. 11 is a flowchart of a fourth embodiment of the color temperature presuming routine.

Referring to FIG. 11, a fourth embodiment of the color temperature presumption routine is based on the fact that the low color temperature light is usually dark and thus has a low light value (LV). In the fourth embodiment, it is determined whether the light value is higher than a predetermined value, the light value of a yellow color, for instance (500). If the light value is equal or higher than the predetermined value, then it is determined to be high color temperature light (502). If the light value is lower than the predetermined value, then the color temperature is presumed according to one of the above-described color temperature presumption methods.

Figure 12:
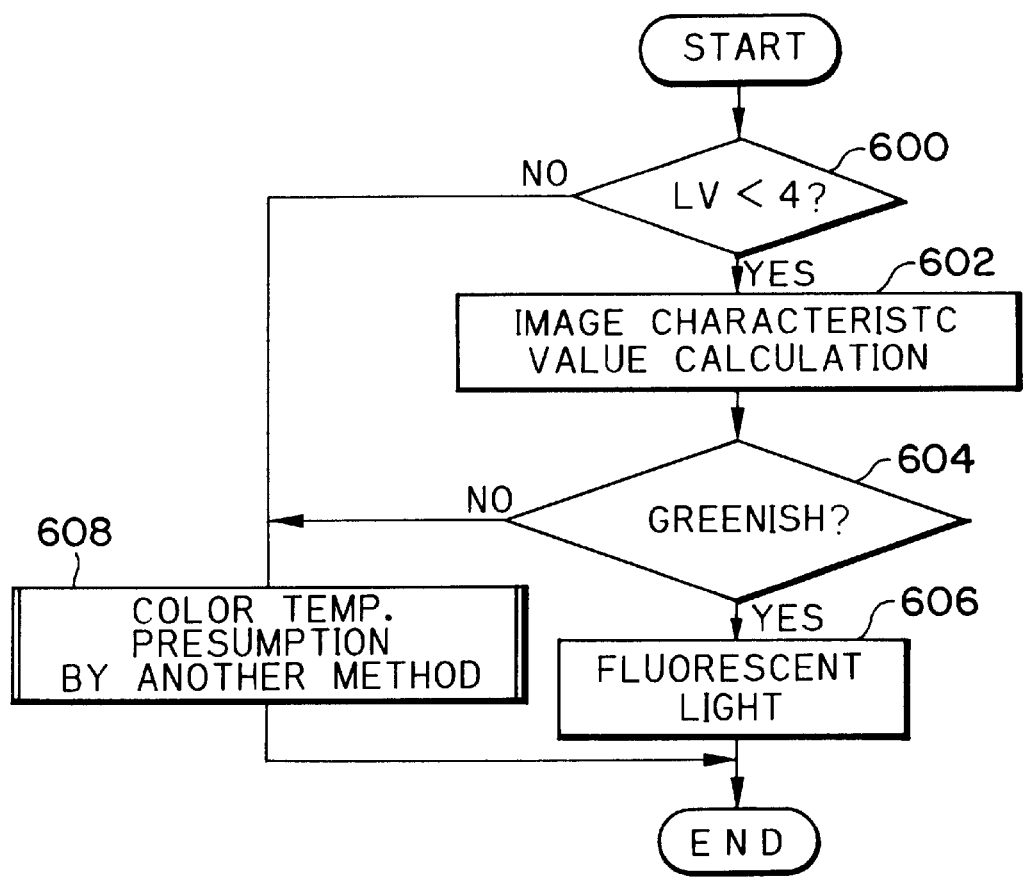
FIG. 12 is a flowchart of a fifth embodiment of the color temperature presuming routine.

A fifth embodiment of the color temperature presumption routine is illustrated in FIG. 12. Initially, it is determined whether the light value (LV) is lower than a predetermined value, e.g., 4 (600). If the light value is lower, then characteristic values of an image, especially the green color density, are calculated (602). Next, it is determined if the green color density is higher than those of the other colors (604). When it is determined that the image is greenish (604), a fluorescent light (606) is determined to be the illumination light. If, on the other hand, it is determined that the light value is higher than the predetermined value, or that the image is not greenish then the color temperature is presumed according to one of the above-described methods (608).

It is to be noted that distinction between tungsten light and the fluorescent light can be exactly performed using the second and fourth methods in combination, as well as by using the second, third and fourth methods in combination.

After executing the light source classification and color temperature presumption, a fundamental print-exposure amount is calculated based on the characteristic values according the following exposure amount equation in which respective coefficients are previously determined depending on the light source classification.

$$\log Ej = Sj \cdot \{Cj(dj - dwj) + dwj)\} + Kj \quad (1)$$

wherein $$dj = Dj - NDj \quad (2)$$

$$dwj = \left(\sum_{j=1}^{3} dj\right) / 3 \quad (3)$$

and j: 1, 2 or 3 indicative of R, G, or B, respectively;
Ej: Exposure control value corresponding to exposure amount;
Dj: Density, e.g., LATD, of the picture frame to be printed;
NDj: Averaged density, e.g., LATD, of a standard negative or a plurality of picture frames to be printed;
Sj: Slope control value;
Cj: Color correction value;
Kj: Constant depending on the properties of printer, film and photographic paper.

The coefficients of equation (1) for each kind of light source are set as follows:

When the presumed color temperature of the light source is lower than a predetermined value, the color correction coefficient Cj is set at a value such that little or no color correction is effected by that color correction value because photographers often use such low color temperature light, such as the red glow of the sunset, tungsten light, winter daylight or the light of the morning sun, for illumination for artistic purposes. In other words, the image taken under a low color temperature light is printed with lowered correction, for example, with a color correction value Cj of about 0.5. In this case, color failure is corrected, but light source color correction is not effected. As a result, the image taken under the tungsten light, for instance, will be regenerated as a print of high YR tone. When the color correction value Cj is set at about 1.3, which is one of the lowest values of the predetermined high color correction values, the color failure is not corrected, though the light source color correction is effected. As a result, if the illumination light is tungsten light, the influence of the tungsten light somewhat remains in the printed image. Thus, by performing little or no color correction, the influence of illumination light on the negative is reflected in the finished print, so that it is possible to make a print in accordance with the intention of the photographer.

If the presumed color temperature is high, such as when the image was taken on a cloudy day, in the shade, at dawn, etc., such a color correction value Cj is set as to perform a large color correction. For example, when the color correction value Cj is set at 2.0, only the light source color correction is effected, so that the image is printed as if it were taken in daylight.

Exposure amount determining methods based on flash light are disclosed in more detail in Japanese Laid-open Patent Publications Nos. 1-296230 and 1-302336. Methods which depend on the kind of illuminating light, such as fluorescent light, tungsten light or specific color temperature of light, are disclosed in Japanese Laid-open Patent Publications Nos. 1-280730, 1-280732, and 1-293329.

Next, methods will be described for re-calculation and correction of the above fundamental exposure amount using other photographing data besides the light source data (see FIG. 6).

Figure 13:
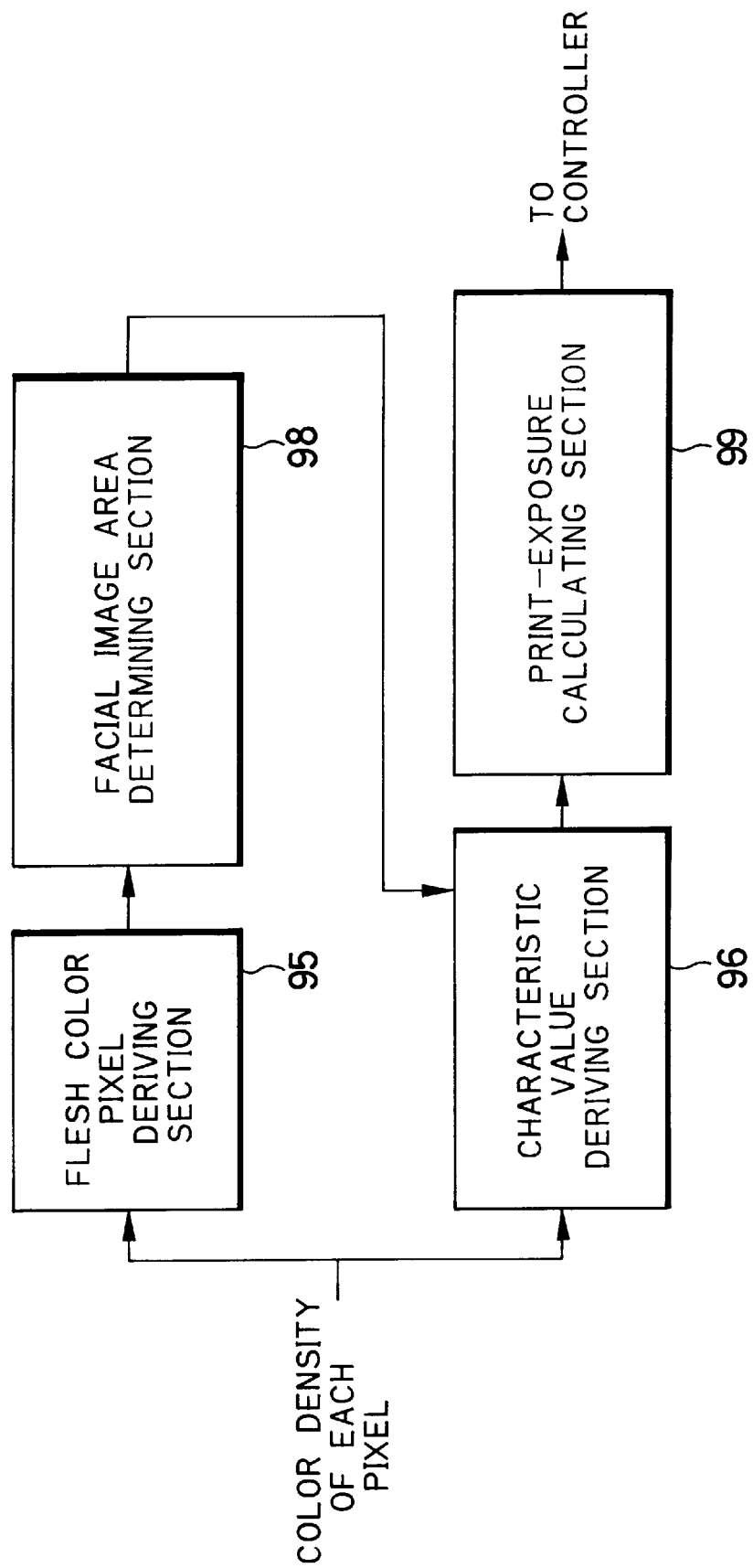
FIG. 13 is a block diagram embodying an exposure correction method based on the facial density of a human subject.

If portrait data is recorded (216), re-calculation of the fundamental exposure amount, especially relating to the density, is performed based on the facial density of the human subject of the frame to be printed (218). As illustrated in FIG. 13, a flesh color pixel deriving section 95 determines whether an individual pixel is of flesh color with reference to data defining a flesh color range. The flesh color range is defined, for example, by an elliptically-shaped area within a rectangular coordinate system having density differences $(D_R-D_G)$, $(D_G-D_B)$ as its axes. A pixel whose density differences are coordinate values included within the area of the coordinate system, is determined to be a flesh colored pixel. A rectangle, rhombus or other shape may be used in place of an ellipse.

A facial image area determining section 98 determines a closed area constructed of flesh colored pixels to be a facial image area, and thereafter determines the positions of the pixels of the facial image area. The coordinate values indicative of the position of the facial image area are sent to a characteristic value deriving section 96, which then derives characteristic values with reference to the facial image area position. The characteristic values are used to calculate an exposure amount based on these characteristic values according to a specific equation with emphasis put on a finished facial image. In particular, the characteristic value deriving section 96 reads out the color densities of pixels of the facial image area, and obtains an average value of these color densities. The characteristic value deriving section 96 also calculates the maximum value and minimum value of pixels within the frame, an average density of a particular area such as a central area and peripheral area of the frame, and other characteristic values.

The characteristic values obtained are sent to a print-exposure calculating section 99 and are substituted into a print exposure amount calculation equation which emphasizes a flesh color, such as disclosed in U.S. Pat. No. 4,769,695 (which corresponds to Japanese Laid-open Patent Publication No. 62-189456).

It is also possible to determine a facial image area on the basis of the principal subject position data and the portrait data, in place of the above method of deriving flesh colored pixels.

Figure 14A:
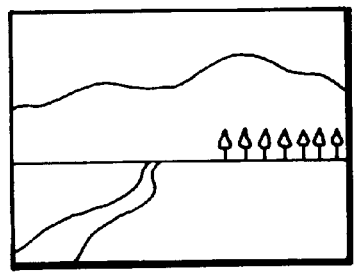
FIGS. 14A to 14D are illustrations for explaining an exposure correction method which determines an effective area of a frame based on subject distance data.

There is another method of flesh color emphasizing exposure amount calculation which is suitable for such a case where no principal subject position data is recorded. A background area surrounding the principal subject is presumed based on the photographic distance data, and a principal subject emphasizing exposure amount is calculated with reference to characteristic values of a principal subject area excluding the presumed background area. In this case, in order to distinguish the background area from the effective area excluding the background area and to calculate an exposure amount with emphasis put on image data included in that effective area, the subject distance L may be classified as follows:

$$10\,m \leq L \ldots \text{FIG. 14A} \quad (1)$$

Figure 14B:
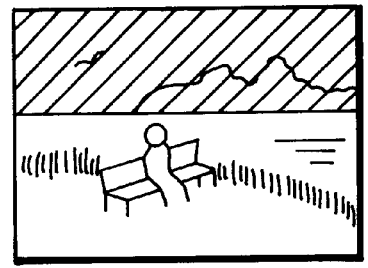

Mostly landscape photography, and thus the effective area includes the whole area of the frame;

$$5m \leq L < 10m \ldots \text{FIG. 14B} \quad (2)$$

Figure 14C:
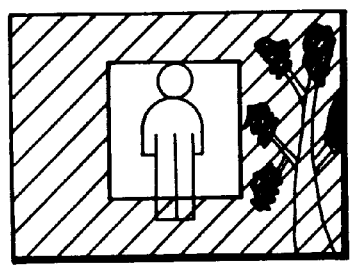

Mostly a portrait but attaching certain importance to the landscape, and thus the effective area excludes the upper portion of the frame (the hatched or shaded portion in the figure).

$$2m \leq L < 5m \ldots \text{FIG. 14C} \quad (3)$$

Figure 14D:
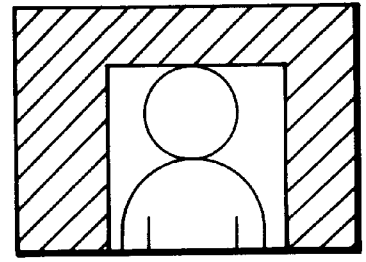

Mostly a full-length portrait, and thus the effective area excludes the peripheral portion of the frame (the hatched portion).

$$L < 2m \ldots \text{FIG. 14D} \quad (4)$$

Mostly a waist-up portrait, and thus the effective area excludes the upper as well as right and left hand portions of the frame (the hatched portion).

Figure 15:
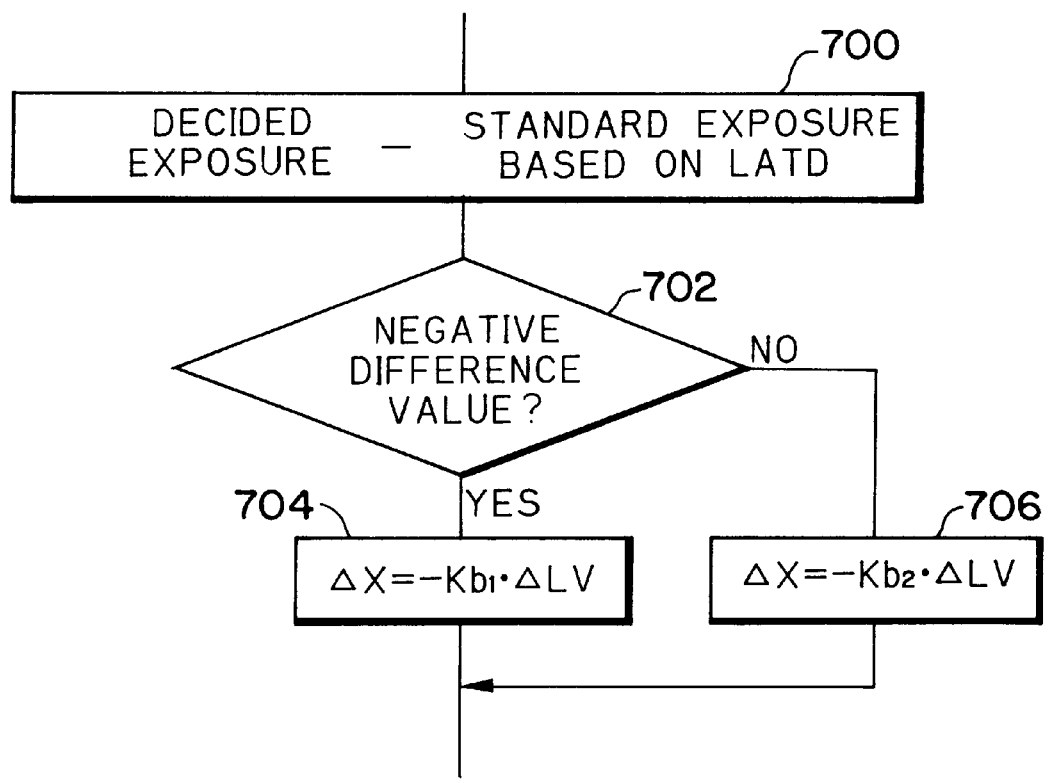
FIG. 15 is a flowchart of a print-exposure correction routine used in a case where there is rear light data.

If rear light is detected (220), then the exposure amount is corrected (222). FIG. 15 illustrates a method of density correction of the exposure amount where there is rear light data. The density correction is dependent on the degree of the rear light. In this method, the difference between the determined exposure amount and an exposure amount, which has been determined based on an average frame density such as LATD, is obtained (700). Thereafter, it is determined whether the difference is negative or positive (702). Depending on whether the difference is negative or positive, a different weighting value KB1 or KB2 is used in the equation for calculating the exposure correction amount $\Delta X$:

$$\Delta X = -KB1 \times \Delta LV \quad (4)$$

$$\Delta X = -KB2 \times \Delta LV \quad (5)$$

That is, if the difference is negative, the degree of the rear light is determined based on the characteristic values (704). In this case, the rear light correction coefficient KB1 is set at, for example, 0.5 so as to make the correction amount $\Delta X$ smaller. If the difference is positive or "zero", it is considered that the principal subject was disposed by a window in a room, or the rear light is extremely bright so that it is impossible to decide the degree of the rear light based on the characteristic values (706). In such a case, the rear light correction coefficient KB2 is set at 1.0 so as to give a large correction amount $\Delta X$.

Figure 16:
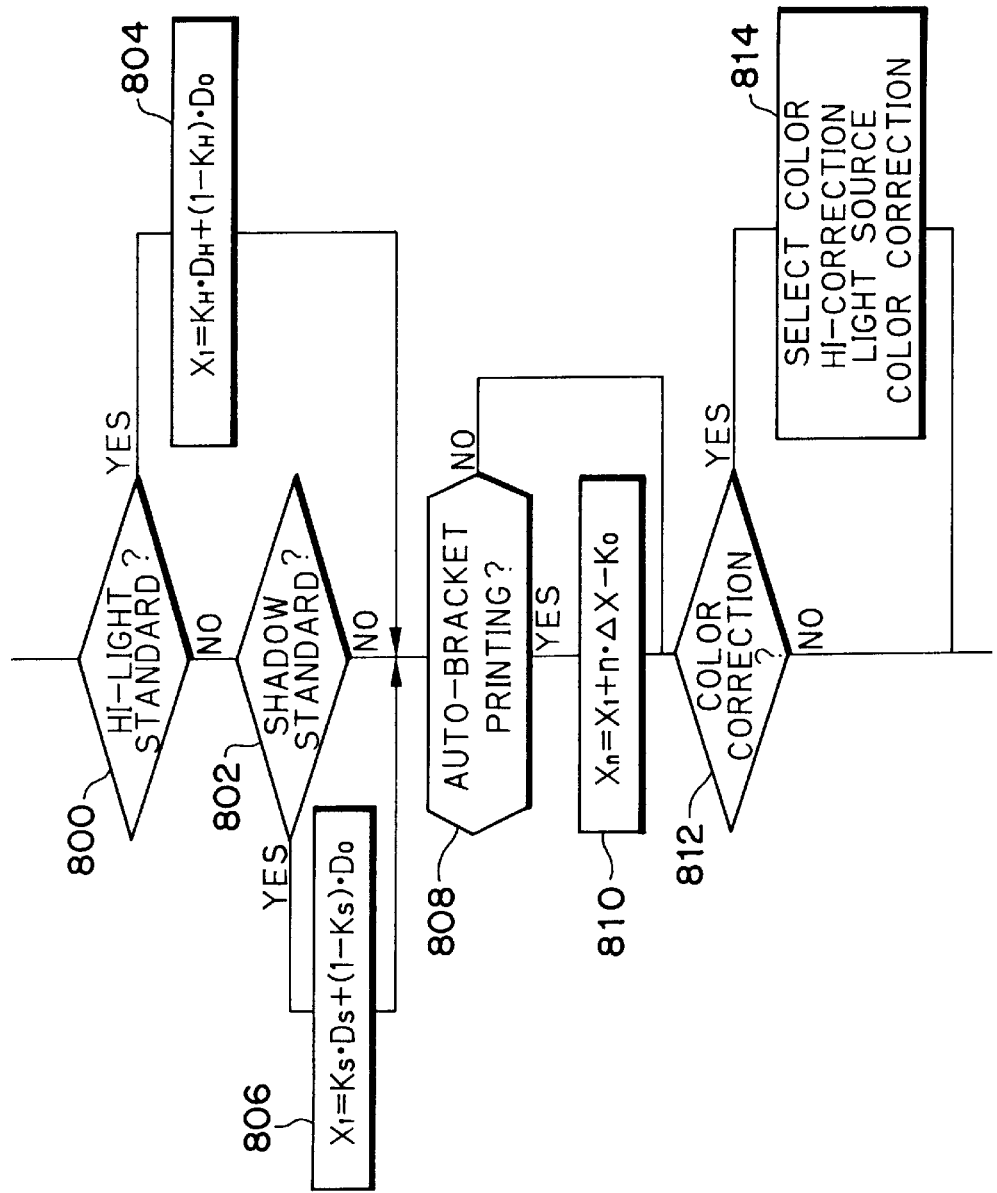
FIG. 16 is a flowchart of a print-exposure correction routine used in a case where there is rear light data.

Further, if any artistic intention data is recorded (224), then the exposure amount is corrected in color and density corresponding to the artistic intention data (226). As illustrated in FIG. 16, if there are hi-light standard data or shadow standard data (800; 802), the exposure amount is corrected in accordance with the following equations (804; 806):

$$X1 = K_H \times D_H + (1-K_H) \times Do \quad (6)$$

$$X1 = K_S \times D_S + (1-K_S) \times Do \quad (7)$$

wherein:

$K_H$, $K_s$: 0.7;

$D_H$: Density of hi-light portion of a frame;

$D_s$: Density of shadowed portion of a frame;

Do: Density corresponding to the exposure amount decided in the preceding step.

If auto-bracket print command data are recorded (808), which commands making a series of prints from the same frame using gradually varied print-exposure amounts just as with so-called auto-bracketing photography, then the respective print exposure amounts are decided according to the following equation (810):

$$Xn = X1 + n \times \Delta X - Ko \qquad (8)$$

wherein:

n: Integer (2 to 10);

Ko: Constant;

ΔX: Constant exposure correction amount (10% of the exposure amount)

If color correction data are recorded (812), then color correction according to the kind of the light source is performed by selecting a color high correction (814).

Color correction for compensating the aging of the photographic film can be made as follows (228; 230). First, the number of days elapsed from the date of production of the film to the photographing date (a first number of elapsed days), and the number of days elapsed from the photographing date to the developing date (a second number of elapsed days) are calculated. Thereafter, color correction values Cj corresponding respectively to the first number of days and the second number of days are calculated by interpolation with reference to a color correction table which predetermines a color correction value Cj for each number of elapsed days.

The color correction table is represented by the diagram shown in FIG. 17. FIG. 17 indicates the characteristic curve Cf of the color correction value relating to the first number of elapsed days, and the curve Cs that of the color correction value relating to the second number of elapsed days. In the color correction table, it is predetermined that the color correction value is 1.0, that is, the correction value for the standard negative when the number of elapsed days is "zero". The reason why the curve Cs is steeper than the curve Cf is that latent images recorded on the film degrade faster during the time period from the photographing to the developing, as compared with the aging of the film having no latent images, such that it is necessary to correct the color densities of the image to a relatively large extent. The sum of a color correction value calculated according to the curve Cf and a color correction value calculated according to the curve Cs, or the additive mean value of these color correction values, or either one of these color correction values is used as the effective color correction value.

As an alternative to the color correction method for compensating the aging of the photographic film discussed above, it is possible to calculate correction values for aging in advance, and to add a corresponding one of these correction values to the exposure amount.

If any print order data, such as a magnification of trimming and a trimming position, are recorded on the film, the magnification of a printing lens is changed corresponding to the designated trimming magnification, and the film is horizontally moved to set it correspondingly to the designated trimming position. Furthermore, if photographing date print order data is recorded, the photographing date is determined with reference to the photographing date data, and the photographing date is printed in an appropriate position on the photographic paper.

Figure 18:
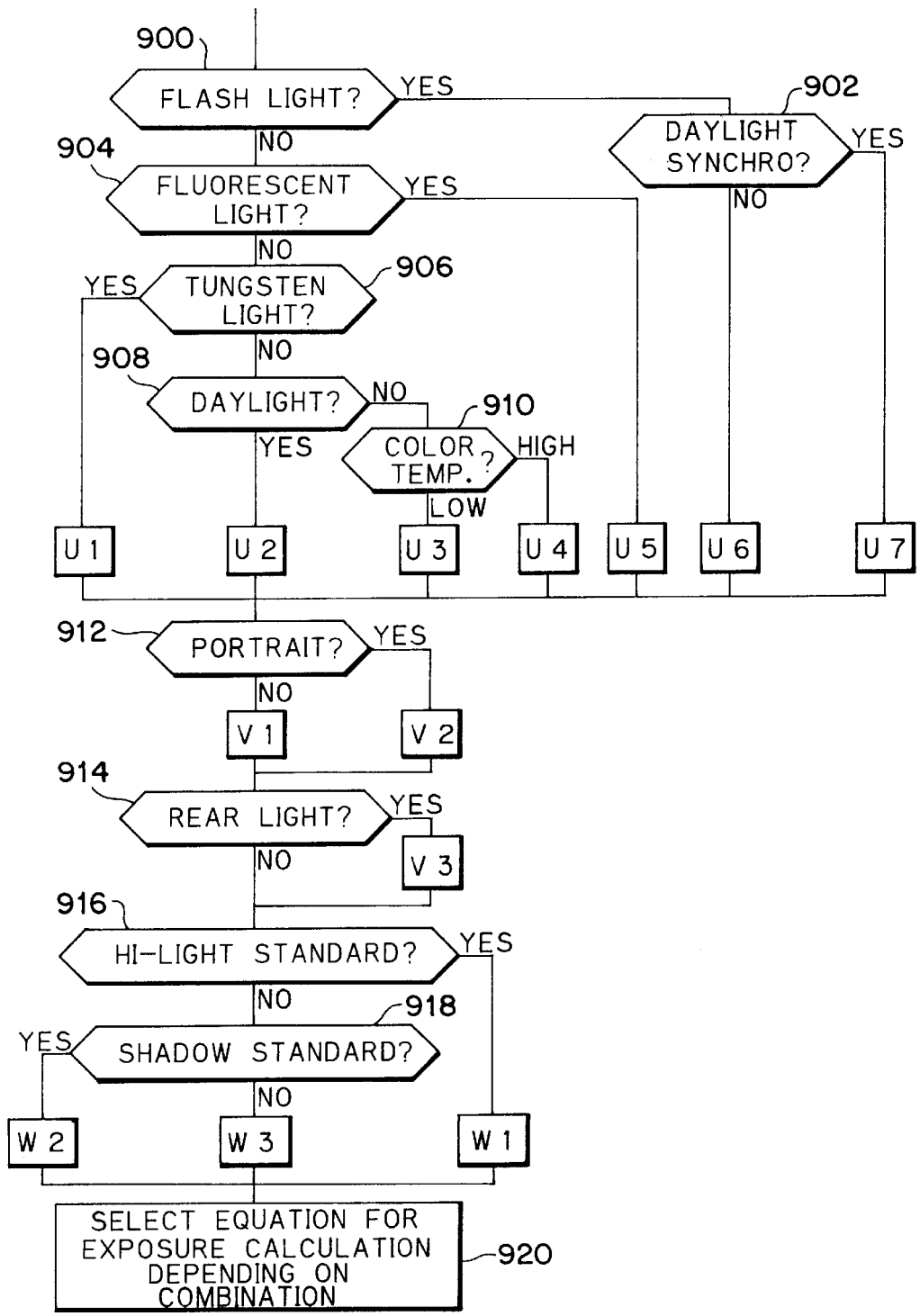
FIG. 18 is a flowchart explaining a second program sequence for controlling print-exposure.

Although the above-described embodiment teaches to determining a fundamental exposure amount based on light source data and, thereafter, correcting the fundamental exposure amount by correction values given according to portrait data, rear light data, artistic intention data and so forth, alternatively, it is possible to classify the negative image depending on the combination of recorded data, such as light source data (U), portrait data and/or rear light data (V), hi-light standard data or shadow standard data (W), and so forth, as shown in FIG. 18. In FIG. 18, steps 900–918 are not fully described below as they substantially correspond to operations discussed above. In this embodiment, a suitable exposure amount calculating equation is selected based on the combination of the respective factors (U. V, W) (920).

While the invention has been described in detail above with reference to preferred embodiments, various modifications within the scope and spirit of the invention will be apparent to people skilled in this technological field. Thus, the invention should be considered as limited only by the scope of the appended claims.

For example, it may be possible to set a suitable print condition using Fuzzy theory by defining a membership function for each data such as light source data, portrait data, rear light data and so forth, so as to control print-exposure depending on these data.

Although data transmission from the camera side to the printer is described as being performed by means of the transparent magnetic layer provided on the rear surface of the photographic film in the above embodiment, it is also possible to record data electrically in an IC memory such as an EPROM. It is also possible to record data optically on the photosensitive layer of the photographic film in the peripheral area surrounding the image frames.

What is claimed is:

1. A photographic printing method for printing an image frame on a photosensitive material, the image frame being placed on a photographic film by a camera which records photographing data on a recording medium upon photographing, said method comprising the steps of:

(a) memorizing a plurality of conversion systems for converting the photographic data into data codes that can be used for printing, each of the conversion systems being prepared for one of a plurality of recording formats of the photographing data on the recording medium;

(b) recording index data along with the photographic data on the recording medium, the index data indicating the recording format of the photographic data corresponding thereto;

(c) reading the index data and the photographic data when printing;

(d) selecting one of the conversion systems corresponding to the index data;

(e) converting the photographic data read according to the one of the conversion systems selected to produce converted photographing data;

(f) obtaining photometric values from the image frame; and (g) determining a print-exposure amount based on the converted photographing data and the photometric values.

2. A photographic printing method as recited in claim 1, wherein the conversion systems comprise conversion tables.

3. A photographic printing method as recited in claim 1, wherein the recording medium is a magnetic recording layer provided on a rear surface of the photographic film opposite to a surface on which the image frame is recorded.

4. A photographic printing method as recited in claim 1, wherein the recording medium is the photographic film, and the photographic data is recorded in an area outside of the image frame.

5. A photographic printing method as recited in claim 4, wherein the photographic data is optically recorded on the photographic film.

6. A photographic printing method as recited in claim 1, wherein step (g) comprises the steps of:
   (i) calculating a first print-exposure value based on the photometric values;
   (ii) obtaining an exposure correction value based on the converted photographic data; and
   (iii) correcting the first print-exposure value by the exposure correction value.

7. A photographic printing method as recited in claim 1, wherein the photographic data includes at least light source data and none, one or more of daylight synchronized flash data, portrait data, rear light data, and artistic intention data.

8. A photographic printing method as recited in claim 1,
   wherein the photographic data includes at least light source data for discriminating a light source type, and
   wherein the print-exposure amount is determined in step (g) according to one of a plurality of exposure amount calculation equations which are prepared for each of the light source types or a combination of the light source types.

9. A photographic printing method as recited in claim 8, wherein the light source type is determined by color temperature.

10. A photographic printing method as recited in claim 9, wherein the light source type is one of flash light, fluorescent light, tungsten light, and daylight.

11. A photographic printing method as recited in claim 8, wherein the image frame includes a principal subject, and each of the exposure amount calculation equations includes characteristic values of the principal subject.

12. A photographic printing method as recited in claim 11, wherein the characteristic values of the principal subject are calculated according to the following steps:
   detecting a principal subject image within the image frame; and
   deriving the characteristic values from the photometric values of the principal subject image.

13. A photographic printing method as recited in claim 12, wherein the photographic data includes at least portrait data and principal subject image data for the image frame, and the principal subject image is detected based on the principal subject image data.

14. A photographic printing method as recited in claim 8, wherein the artistic intention data includes at least one of hi-light standard data, shadow standard data and auto-bracket printing data.

15. A photographic printing method as recited in claim 1,
   wherein the photographic data includes at least light source data, the light source data discriminating type of light source used with the image frame, and
   wherein the print exposure amount is determined in step (g) based on the type of light source indicated by the light source data and the absence or presence of daylight synchronized flash data.

16. A photographic printing method as recited in claim 15, wherein the type of light source is one of flash light, fluorescent light, tungsten light, and daylight.

17. A photographic printing method as recited in claim 16, wherein the type of the light source is determined according to color temperature.

18. A photographic printing method as recited in claim 17, wherein the color temperature is presumed.

19. A photographic printing method as recited in claim 18, wherein the color temperature is presumed based on respective differences between three primary color densities of the light source and densities of the image frame to be printed.

20. A photographic printing method as recited in claim 17, wherein the color temperature is presumed using a quadrant system indicating color differences $D_R$–$D_G$ and $D_G$–$D_B$ in its horizontal and vertical axes, respectively, wherein, $D_R$ is a density of red color, $D_G$ is a density of green color, and $D_B$ is a density of blue color.

21. A photograph printing method as recited in claim 17, wherein a light value of the image frame is compared with a predetermined value, and if the light value is higher than the predetermined value, the color temperature is presumed to be high.

22. A photographic printing method as recited in claim 17, wherein a light value of the image frame is compared with a predetermined value, and if the light value is lower than the predetermined value, it is determined whether the image frame has a high green color density compared with other colors, thereby to determine that the light source is a fluorescent light when the image frame has the high green color density.

23. A photographic printing method as recited in claim 16, wherein the photographic data further includes at least one of portrait data, rear light data, and artistic intention data, and
   wherein a correction amount for the fundamental exposure amount is determined based on at least one of the portrait data, the rear light data, and the artistic intention data.

24. A photographic printing method as recited in claim 1, said method further comprising:
   (h) recording printing data for the image frame on the recording medium when printing the image frame.

25. A photographic printing method as recited in claim 24, wherein the printing data includes at least developing date data.

26. A photographic printing method as recited in claim 25, wherein the recording medium further comprises film data recorded on manufacturing of the photographic film.

27. A photographic printing method as recited in claim 26, wherein the film data includes at least data on film production date data.

28. A photographic printing method as recited in claim 27,
   wherein said deciding in step (g) comprises the steps of:
   (i) reading at least one of the film production date data and the developing date data; and
   (ii) calculating a film aging compensation amount based on the data read in step (i), and
   wherein the film aging compensation amount is used to compensate the print-exposure amount.

29. A photographic printing method for printing an image frame on a photosensitive material, the image frame being placed on a photographic film by a camera which records photographing data and recording format data on a recording medium upon photographing, said method comprising the steps of:
   (a) reading the recording format data and the photographic data from the recording medium;
   (b) converting the photographic data based on the recording format read in step (a) to produce converted photographing data; and (c) printing the image frame on the photosensitive material based on the converted photographing data.

30. A photographic printing method as recited in claim 29, said method further comprising:
(d) recording printing data for the image frame on the recording medium when printing the image frame.

31. A photographic printing method as recited in claim 29, wherein said printing in step (c) comprises the steps of:
(c1) obtaining photometric values from the image frame; and
(c2) deciding a print-exposure amount based on the converted photographing data and the photometric values.

32. A photographic printing method as recited in claim 31,
wherein the photographic data includes at least light source data for discriminating a light source type, and
wherein said print-exposure amount is decided in step (c2) according to one of a plurality of exposure amount calculation equations which are prepared for each of the light source types or a combination of the light source types.

33. A photographic printing method as recited in claim 31,
wherein the photographic data includes at least light source data, the light source data discriminating a type of light source used with the image frame, and
wherein the print exposure amount is determined in step (d) based on the type of light source indicated by the light source data and the absence or presence of daylight synchronized flash data.

34. A photographic printing method as recited in claim 31, said method further comprising:
(e) recording printing data for the image frame on the recording medium when printing the image frame.

35. A photographic printing method for printing an image frame on a photosensitive material, the image frame being placed on a photographic film by a camera which records photographing data on a recording medium upon photographing, said photographing data includes at least light source data, the light source data discriminating type of light source used with the image frame, said type of light source being one of flash light, fluorescent light, tungsten light, and daylight and being determined according to color temperature, said method comprising the steps of:
(a) memorizing a plurality of conversion systems for converting the photographic data into data codes that can be used for printing, each of the conversion systems being prepared for one of a plurality of recording formats of the photographing data on the recording medium;
(b) recording index data along with the photographic data on the recording medium, the index data indicating the recording format of the photographic data corresponding thereto;
(c) reading the index data and the photographic data when printing;
(d) selecting one of the conversion systems corresponding to the index data;
(e) converting the photographic data read according to the one of the conversion systems selected to produce converted photographic data;
(f) obtaining photometric values from the image frame; and
(g) determining a print-exposure amount based on the type of light source indicated by the light source data and the absence or presence of daylight synchronized flash data;
wherein an individual sunrise time and sunset time and a time necessary for the sun to reach a predetermined angle are previously set for each date and classified according to predetermined photographic regions, and
wherein the color temperature is presumed based on a photograph date, a photograph time and a region which are included in the photographic data.

* * * * *